United States Patent [19]

Gupta

[11] Patent Number: 4,944,824
[45] Date of Patent: * Jul. 31, 1990

[54] PROCESS FOR PREPARATION OF TOOLING OF CARBON FIBER REINFORCED POLYIMIDE FOR COMPOSITES MANUFACTURE

[75] Inventor: Dipak Gupta, Hockessin, Del.

[73] Assignee: E. I. Du Pont de Nemours and Company, Wilmington, Del.

[*] Notice: The portion of the term of this patent subsequent to Jul. 25, 2006 has been disclaimed.

[21] Appl. No.: 248,393

[22] Filed: Sep. 23, 1988

[51] Int. Cl.$^5$ .............................................. B32B 31/12
[52] U.S. Cl. .................................. 156/286; 156/307.4; 156/312; 156/331.1; 428/408; 528/348; 528/401
[58] Field of Search .................. 156/307.4, 331.1, 285, 156/286, 312; 528/401, 340, 348; 428/408

[56] References Cited

U.S. PATENT DOCUMENTS 3,575,756 4/1971 Maus .................................. 156/104
4,336,175 6/1982 Gibbs .................................. 524/726

Primary Examiner—Michael W. Ball
Assistant Examiner—Michele K. Yoder

[57] ABSTRACT

Two-stage curing of composite tooling of carbon fiber reinforced polyimide of high Tg.

1 Claim, 1 Drawing Sheet

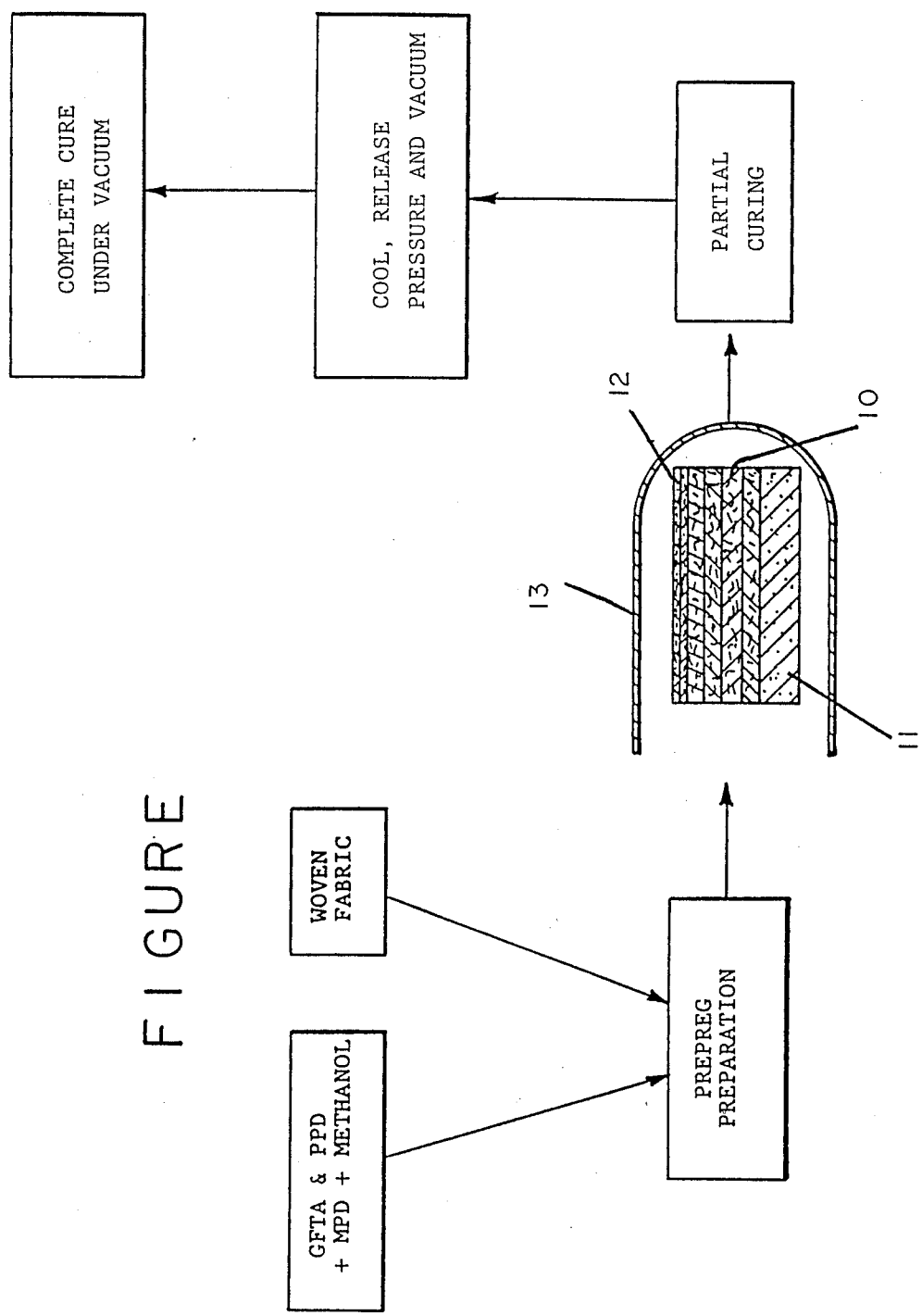

PROCESS FOR PREPARATION OF TOOLING OF CARBON FIBER REINFORCED POLYIMIDE FOR COMPOSITES MANUFACTURE

BACKGROUND OF THE INVENTION

This application is related to my copending and coassigned U.S. patent application Ser. No. 7/176,804, filed Apr. 1, 1988.

The numerous options that exist today for processing of composite materials has led to diversified technologies. Autoclave processing is most widely used in the aerospace industry. Though this process is generally considered as slow and expensive, it allows the production of parts of various dimensions and shapes for airframe components under closely controlled temperature and pressure conditions.

Autoclave processing conventionally requires use of a tool or mold which supports and/or shapes the composite part in its formation. Thus, there is an initial lay-up of prepreg on the tool, a breather layer is placed over the prepreg and the sandwich inserted in a bag in the autoclave. The bag is evacuated and heat and pressure applied until the part is cured after which it is allowed to cool before removal.

The tool plays an important role in the autoclave process because it has a direct bearing on the quality of the part to be produced. The new high temperature matrix resins used in composites, such as bismaleimides, polyimides and thermoplastics (PEEK) are gaining increased importance in applications requiring high service temperatures. Tools for manufacture of parts from these composites should (1) be capable of repeated cycling above 350° F.; (2) be dimensionally stable at the elevated temperatures; (3) be economical to make and use, i.e. fast heat-up; and (4) have a low coefficient of thermal expansion that substantially matches the parts to be fabricated.

Current tool materials, such as epoxy/graphite, machined bulk graphite, ceramics and metals are deficient in one or more important respects. The epoxy/graphite tools do not meet the high temperature requirements for processing composites wherein the matrix resin is bismaleimide, polyimide or PEEK. Monolithic graphite is deficient as a tooling material primarily because of its limited durability. It may be used as a master tool but for repeated or multi-use it exhibits many deficiencies. A major concern with ceramic molds is their large thermal mass requiring high heat input to achieve the desired temperature. Among other things, this tends to cause degradation of the vacuum bag and sealant materials. Finally, the most extensively employed tooling materials are metals such as steel, aluminum and nickel. The biggest negative for the metals is their high coefficient of thermal expansion. The mismatch in thermal expansion between metal tools and composite parts promotes distortion of parts. As a result, steel tools are considered adequate only for relatively flat or slightly curved parts which are trimmed to final dimension after cure.

The present invention provides a novel process for preparation of tooling that overcomes most, if not all, of the deficiencies of prior art tools yet is a simpler and less expensive procedure than that taught in the aforementioned U.S. patent application Ser. No. 07/176,804.

DRAWINGS

The FIGURE depicts the tool manufacturing process of this invention. In Step 1, carbon fiber fabric is combined with impregnating solution to form the prepreg. In Step 2, plies of prepreg 10 with surface plies 12 are layed-up an a master tool 11, and enclosed in a vacuum bag 13. vacuum is drawn on the bag while external pressure and heat are applied in the autoclave to achieve partial curing. In Step 4 the tool assembly is allowed to cool, the pressure and vacuum released and the tool assembly is removed from the vacuum bag. In Step 5, the tool assembly with a fresh breather layer is again enclosed in a vacuum bag, vacuum is drawn on the bag and the assembly is heated without application of external pressure until the tool is completely cured.

SUMMARY OF THE INVENTION

This invention provides a novel process for preparing a tool for fiber reinforced high temperature composite manufacture of parts comprising from 35 to 45 volume % of a polyimide consisting essentially of the following recurring structural units:

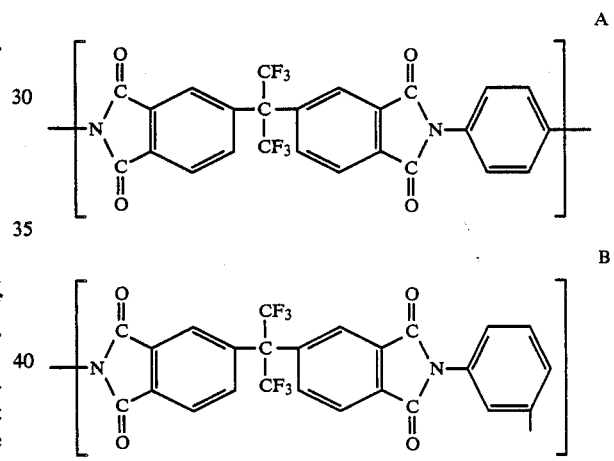

where A is present in an amount of about 95% and B the remainder, and from 55 to 65 volume % of carbon fiber reinforcement, said tool having a porosity of less than 6% and a Tg of at least 730° F.

The process comprises forming a lay-up of prepregs containing carbon fiber reinforcement and substantially stoichiometric quantities of a mixture of diamines consisting essentially of about 95% p-phenylene diamine with the remainder m-phenylene diamine, and 2,3-bis-(3',4'-dicarboxyphenyl)hexafluoropropanol in an amount sufficient to produce 35 to 40 volume % of polyimide in the prepreg upon curing, enclosing the lay-up in a vacuum bag, heating the layup to a temperature in the range of about 250° to 400° F. while pulling a vacuum on the contents of the bag and while applying a pressure on the bag of at least 180 pounds per square inch, cooling the assembly while releasing the pressure and vacuum, and curing the assembly without application of external pressure but with application of vacuum to remove polymerization byproducts by heating in an oven to a temperature of at least 700°–725° F., at a rate of 1°–3° F. per minute until the Tg of the composite tool reaches at least 730° F.

DETAILED DESCRIPTION OF THE INVENTION

The novel process of the present invention involves preparation of the composite tool on a master tool. Manufacture of the master tool or master is well known in the art. It will be understood that a male master is used to produce a female tool of the invention which in turn is used to make a male composite part.

The composite tool is made by first preparing a solution from 2,3-bis(3,4'-dicarboxyphenyl) hexafluoropropanol (6FTA) plus substantially stoichiometric quantities of diamines comprising m-phenylene diamine (MPD) and p-phenylene diamine (PPD) in the molar proportions of about 95% PPD, with the remainder MPD. The particular solvent employed is not critical. Preferably the solvent is ethanol, but N-methylpyrrolidone (NMP), combinations of NMP and ethanol and diglyme can also be used for this purpose. The solvent is ordinarily employed in an amount of from 60 to 70% by volume based on the reactants. Application of heat to the solution produces an aromatic condensation polyimide. These polyimides are linear amorphous polymers, free of crystallinity and essentially non-crosslinked. In the cured form, they are sufficiently thermoplastic to permit melt flow when pressure is applied above the polymer softening point or glass transition temperature (Tg).

The tooling prepreg is prepared by passing a carbon fiber fabric directly through the prepreg solution as by dip-coating, followed by partial drying to the desired level of volatiles. Any of a variety of carbon fiber fabrics may be employed for this purpose. The impregnated fabrics or prepregs are tacky, drapable fabrics which are readily handled in lay-ups. Various weave styles, yarn counts and ply thickness can be used. During heating and curing of the prepreg, solvent is given off as well as water, which is formed in the imidization reaction.

High quality tools are fabricated using the autoclave molding technique under appropriate environments. The specifics of time, temperature and pressure will vary depending upon the tool dimensions, lay-up configurations, autoclave geometry, e.g., vacuum port placement, vacuum port diameter, etc., with the optimum conditions readily determinable by those skilled in the art.

A typical autoclave procedure is as follows:

1. The monolithic graphite or ceramic master tool is sealed with a high temperature sealant available in the art. A mold release agent (Freekote44) is applied in several coats, hot air dried each time and then baked at the prescribed temperature.

An advantage of the present invention is that the master may be composed of reinforced plastics that can withstand temperatures of up to 400° F. without substantial distortion. Such masters can be employed because they are required only during the autoclave step where vacuum and pressure are applied at temperatures of up to 400° F. as described in step 4 below.

2. Plies of the tooling prepreg are applied one at a time to the master at desired orientations being careful to work the prepreg into all radii and corners, making sure all entrapped air is removed. Sufficient layers are applied to provide a tool having the desired wall thickness after curing. In the initial lay-up of the prepreg, there are formed pockets of entrapped air, and during the initial heat-up, additional voids are formed as binder solvents and water from the condensation polymerization are evolved. These voids will be substantially eliminated in the subsequent application of autoclave pressure.

3. A porous tetrafluoroethylene film or breather cloth is layed-up over the prepreg plies for debulking. A vacuum bag is placed over the lay-up allowing an excess of film to fill the radii, corners and depressions in the master to avoid bridging and a vacuum of at least 20 inches is employed to debulk the lay-up.

4. The lay-up is then placed in an autoclave and a vacuum source capable of maintaining 4–6 inches Hg vacuum level attached. The vacuum is then applied while the assembly is heated slowly to a temperature in the range of about 200° to 220° F. and held there for 80 to 100 minutes, at which time the assembly is slowly heated to a temperature of about 240° to 260° F. A vacuum of 28 inches is drawn on the bag and a pressure of from 180 to 200 psi is applied to the bag at the elevated temperature and once again the assembly is slowly heated up to about 250° to 400° F. The assembly is generally held within this temperature range for from about 8 to 12 hours to permit sufficient curing to occur so that a stable structure is obtained. Too short a hold period will lead to collapse of the structure upon removal from the autoclave or upon subsequent heating outside the autoclave. On the other hand, excessive hold periods are expensive and serve no useful purpose, as will be well understood by those skilled in the art. The assembly is then cooled slowly at about 2°–3° F. per minute to about 200° F. The pressure can then be released, the vacuum discontinued and the part removed from the autoclave.

During the heat-up, melt viscosity decreases at first, due to thermal effects alone. Then, with additional heating, molecular weight build up accelerates, more and more solvent is evolved, and the viscosity begins to increase. Consolidation pressure should be applied when the melt viscosity is in the proper range. Premature pressurization can lead to excessive loss of binder resin which is still too fluid at that point. On the other hand, an excessive delay in the application of consolidation pressure results in a failure to eliminate the voids, because the autoclave pressure alone may be insufficient to overcome the high matrix melt viscosity.

Rather than keeping the tool assembly in the autoclave at the elevated temperatures until the tool is completely cured, it has been found surprisingly that curing of the part outside the autoclave and without application of external pressure gives substantially the same result at reduced costs. This constitutes a further significant advantage of the present invention. Successful completion of the curing process of a commercial tool requires vacuum to be applied and a heat-up rate slow enough to allow the remaining volatiles and polymerization byproducts such as water to diffuse through the laminate in a controlled fashion, to avoid excessive internal pressures that can result in delamination or blistering. Small parts can be made as in Example 1 below without application of vacuum in the post-curing step.

Thus, the partially cured tool assembly is slowly cooled, removed from the vacuum bag of the autoclave, a fresh breather layer is applied and the tool assembly once again inserted in a vacuum bag. With vacuum applied but with no external pressure, the assembly, now at about room temperature, is heated in an oven (the autoclave is no longer needed) to a temperature of at least 700°-725° F. at a rate of from 1° to 3° F. per minute until the Tg of the composite tool reaches at least 730° F. Since substantial polymerization takes place while the laminate tool assembly is heated in this second curing step, residual solvent and polymerization byproducts must be removed as they are formed if cracking, blisters and delamination is to be avoided. The application of vacuum under slow heating allows the remaining volatiles to diffuse through the tool in a controlled fashion. The cured laminates show no blisters, delaminations or surface cracking. They also show excellent retention of flexural strength and flexural modulus. Post-curing of the laminates directly in the oven at 700° F. to 750° F. without the small incremental increases in temperature results in tools with physical distortions and high levels of porosity. It is believed that this is caused by the fact that internal pressure of the volatiles in the laminate is no longer counteracted by the external pressure applied in the autoclave.

One method of establishing the completeness of cure of a laminate is to determine the glass transition temperature (Tg). The glass transition temperature is defined as the point or narrow region, on the temperature scale where the thermal expansion coefficient undergoes a discontinuity (which is also accompanied by discontinuities in heat capacity).

Using the Du Pont 983 Dynamic Mechanical Analyzer System, the Tg is determined by the point of intersection of the lines drawn tangent to the pre-Tg and post Tg parts of the curve. An even more definitive indication of how a laminate will perform at elevated temperatures is believed to be the "onset temperature". The onset temperature is defined as the point at which the pre-Tg part of the curve starts to depart from linearity. This temperature is usually 15°-20° F. below the Tg in a well cured composite. The heat-up rate in the oven is preferably 5°-10° F. per minute and the cool-down rate 2°-3° F. per minute. Large complex tools are preferably restrained by mechanical means during the post cure cycle to avoid possible dimensional change and the restraint is maintained until the tool is cooled to below 300° F. The slow heating also tends to reduce void content.

High void content in composites causes reduction of mechanical properties. Also, the deterioration of mechanical properties at elevated temperatures proceeds more rapidly because increased surface area accelerates oxidative degradation. Extensive thermal cycling (100 cycles) at 700°-725° F. with the tool of this invention shows very little reduction of flexural strength and almost no loss in flexural modulus. The void levels in the tools of the invention may be determined by a sulfuric acid digestion procedure as described in the aforementioned U.S. application Ser. No. 07/176,804.

The tool prepared by this invention, whether it be flat or non-planar, such as a dish, is suitable for repeated use even for high temperature composite part formation. Preferred tools as described in my aforementioned application have a surface layer comprising a "Kapton" polyimide film.

Example 2 is illustrative of this invention and is not to be construed as limiting. Example 1 shows that for small parts the vacuum application during postcure may be dispensed with.

EXAMPLE 1

Tooling Prepreg

Prepregs were made from woven graphite fiber fabrics and binder solutions which contained stoichiometric quantities of polyimide precursor monomers, i.e., acid and amine, (6FTA, PPD and MPD) in ethanol solvent. The PPD is present in an amount of about 95% of the amine mixture with MPD, the remainder. The binder solutions were prepared at 47–49% cured resin solids (i.e., upon removal of solvent and curing of resin) and had viscosities in the range of 170–216 centipoise at 73° F. Description of the prepregs is found in Table 1. The prepregs were drapable and had good tack for efficient lay-up without trapping much air.

Preparation of Graphite Master

1. Thoroughly seal the machined monolithic graphite master with high temperature sealant and bake at 750° F. for 60 minutes.
2. Apply three coats of high temperature release agent and hot air dry each time to get good release.

Tool Lay-up Procedure

1. Apply three plies (one at a time) of prepreg D (orientation: 0°, +45°, 90°), being careful to work into all radii and corners to eliminate entrapped air.
2. Apply four plies (one at a time) of prepreg A (orientation: 0°, +45°, −45°, 90°).
3. Place a vacuum bag over the lay-up allowing an excess of film to fill the radii, corners and depressions in the master to avoid bridging. Debulk the lay-up under a minimum of 20 inches of Hg. vacuum for 5–10 minutes.
4. Apply eight plies (one at a time) of prepreg B (orientation: 0°, 90°, +45°, −45°, −45°, +45°, 90°, 0°).
5. Debulk the lay-up under a minimum of 20 inches of Hg. vacuum for 5–10 minutes.

Bagging Procedure

1. Place one or more thermocouples between center plies of lay-up.
2. Apply two plies of polytetrafluoroethylene glass separator.
3. Apply four plies glass bleeder cloth (Style 7781).
4. Place a vacuum bag over the lay-up allowing an excess of film to fill all radii, corners and depressions in the master.

Autoclave Cure Process

1. Place the lay-up in an autoclave and attach a vacuum source capable of maintaining 5 inches Hg. vacuum level. Apply vacuum.
2. Heat the tool assembly at a rate of 2° F. per minute to 210° F. Start hold based on the lagging thermocouple and hold at 210° F. fir 90 minutes.
3. Increase temperature to 250° F. at 2° F. per minute.
4. Apply 28 inches Hg. vacuum and 200 psi autoclave pressure while holding at 250° F.
5. Heat the tool assembly to 300° F. at 2° F. per minute, and hold for 10 hours at 300° F.
6. Cool the tool assembly to 200° F. at 2° F. per minute.
7. Release the pressure and vacuum and remove the tool assembly from the autoclave.

Post Polymerization/Post Cure Process

1. Remove the tool assembly from the vacuum bag after the autoclave cure.
2. Insert the tool assembly into a recirculating high temperature air oven.
3. Heat the oven at a rate of 2° F. per minute to 725°–735° F. for 10 hours.
4. Cool down to 300° F. at 2°–3° F. per minute and remove the tool assembly from the air oven.

The tool thus produced had excellent quality and outstanding thermal and mechanical properties (Table 2).

Thermal Cycling in Air at 700° F.

Thermal cycling of the tool was carried out from room temperature to 700° F. in air to simulate the fabrication of high temperature composite parts and to demonstrate the materials' resistance to matrix cracking and physical properties reduction caused by moisture and thermal transients. Table 3 shows the thermal cycling procedure.

Table 4 describes the flexural strength and the flexural modulus at room temperature for the tool after 50, 75 and 100 such thermal cycles at 700° F. Critical examination of the tool failed to reveal any blisters, matrix cracks or surface erosion. Excellent retention of strength and modulus after 100 thermal cycles is the reflection of the high temperature thermal-oxidative stability of both the matrix resin and the reinforcement fiber.

EXAMPLE 2

Tooling prepregs B, C, D, described in Table 1 were used to fabricate the tool of this example.

Tool Lay-up Procedure

1. Apply three plies (one at a time) of prepreg D (orientation: 0°, +45°, 90°).
2. Place a vacuum bag over the lay-up allowing an excess of film to fill the radii, corners and depressions in the master to avoid bridging. Debulk the lay-up under a minimum of 20 inches Hg vacuum for 5–10 minutes.
3. Apply four plies (one at a time) of prepreg B (orientation: 0°, +45°, −45°, 90°).
4. Place a vacuum bag over the lay-up allowing an excess of film to fill the radii, corners and depressions in the master to avoid bridging. Debulk the lay-up under a minimum of 20 inches Hg vacuum for 5 minutes.
5. Apply eight plies (one at a time) of prepreg (orientation: 0°, 90°, +45°, −45°, −45°, +45°, 90°, 0°).
6. Place a vacuum bag over the lay-up allowing an excess of film to fill the radii, corners and depressions in the master to avoid bridging. Debulk the lay-up under a minimum of 20 inches Hg vacuum for 5–10 minutes.

Bagging Procedure

Identical procedure as described in Example 1.

Autoclave Cure Process

1. Place the lay-up in an autoclave and attach a vacuum source capable of maintaining 5 inches Hg vacuum level. Apply vacuum.
2. Heat the tool assembly at a rate of 2° F. per minute 210° F. Start hold based on the lagging thermocouple and hold at 210° F. for 90 minutes.
3. Increase temperature to 250° F. at 2° F. per minute.
4. Apply 28 inches Hg vacuum and 200 psi autoclave pressure while holding at 250° F.
5. Heat the tool assembly to 350° F. at 2° F. per minute, and hold for 10 hours at 350° F.
6. Cool the tool assembly to 200° F. at 2° F. per minute.
7. Release the pressure and vacuum and remove the tool assembly from the autoclave.

Post Polymerization/Post Cure Process

1. Apply one or more thermocouples between center plies of lay-up.
2. Apply two plies of polytetrafluoroethylene glass separator.
3. Apply four plies of glass bleeder cloth (Style 7781).
4. Place a vacuum bag over the lay-up allowing an excess of film to fill all radii, corners and depressions.
5. Insert the bagged tool assembly into an air oven and apply 28 inches Hg vacuum.
6. Heat the oven at a rate of 2° F. per minute to 725°–735° F.
7. Hold at 725°–735° F. for 10 hours.
8. Cool down to 300° F. at 2°–3° F. per minute.
9. Release the vacuum and remove the tool assembly from the autoclave.

The tool produced had excellent quality and a glass transition temperature of 742° F.

TABLE 1

| TOOLING PREPREGS | | | | |
| --- | --- | --- | --- | --- |
|  | A | B | C | D |
| Thickness, mils | 14.0 | 25.0 | 37.0 | 9.0 |
| Weave Style | Plain | 4 HS | 4 HS | Plain |
| Counts, yarn/in. | 12 × 12 | 12 × 12 | 10 × 10 | 24 × 24 |
| Width, inches | 50 | 50 | 50 | 50 |
| Cured Ply Thickness, Vacuum bag, mils Impregnated Fabric | 8.0 | 15.0 | 26.0 | 4.0 |
| Fiber Volume, % | 53–55 | 54–56 | 53–56 | 51–52 |
| Fiber Areal Weight, gm/m$^2$ | 181–184 | 371–374 | 618–647 | 121 |
| Resin Content, % | 40–42 | 39–40 | 37–42 | 44 |
| Volatiles, % | 14–15 | 16–17 | 14–17 | 14 |

TABLE 2

| TOOL PROPERTIES | |
| --- | --- |
| Density, gm/cc | 1.60 |
| Fiber Volume, % | 63.1 |
| Fiber Weight, % | 69.2 |
| Resin Weight, % | 30.8 |
| Void Level, % | 2.6 |
| Flexural Strength, Kpsi | 60.5 |
| Flexural Modulus, Mpsi | 6.5 |
| Glass Transition Temp., 0° F. | 760 |
| TGA Weight Loss (up to 750° F.), % | 0.29 |

TABLE 3

| THERMAL CYCLING, PROCEDURE |
| --- |
| Heat a recirculating air oven to 700° F. |
| Insert panel into the oven at 700° F. The panel is to be unsupported and standing on end. |
| Hold the panel for 30 minutes at 700° F. |
| Take out the panel from the air oven into the room temperature environment. Allow it to cool. |
| Examine the panel under microscope at 60× magnification for surface defects or delamination. |

TABLE 4

| FLEXURAL PROPERTIES (R.T.) | |
|---|---|
| Control | |
| Flex Strength, Kpsi | 60.5 |
| Flex Modulus, Mpsi | 6.6 |
| After 50 Cycles | |
| Flex Strength, Kpsi | 59.7 |
| Flex Modulus, Mpsi | 7.0 |
| After 75 Cycles | |
| Flex Strength, Kpsi | 62.5 |
| Flex Modulus, Mpsi | 6.3 |
| After 100 Cycles | |
| Flex Strength, Kpsi | 57.8 |
| Flex Modulus, Mpsi | 6.2 |
| OBSERVATIONS AFTER CYCLING | |
| o No blisters or delaminations | |
| o No evidence of surface crack or erosion | |

*Recirculating air oven, unsupported and standing on end, 30 minutes soak time at 700° F.

I claim:

1. A method for preparing a composite tool suitable for fabricating composite articles of high Tg comprising forming a lay-up of prepregs containing carbon fiber reinforcement and substantially stoichiometric quantities of a mixture of diamines consisting essentially of about 95% p-phenylene diamine with the remainder m-phenylene diamine and 2,3-bis-(3',4'-dicarboxyphenyl)hexafluoropropanol in an amount sufficient to produce 35 to 45 volume % of polyimide in the prepreg upon curing, enclosing the lay-up in a vacuum bag, heating the lay-up to a temperature in the range of about 250° to 400° F. while pulling a vacuum on the contents of the bag and while applying a pressure on the bag of at least 180 pounds per square inch, cooling the assembly while releasing the pressure and vacuum, and curing the assembly by heating in an oven to a temperature of at least 700°–725° F. at a rate of 1°–3° F. per minute until the Tg of the composite tool reaches at least 730° F. without application of external pressure but with application of vacuum to remove polymerization by-products.

* * * * *